United States Patent
Kutsuwada et al.

(10) Patent No.: US 10,315,343 B2
(45) Date of Patent: Jun. 11, 2019

(54) MANUFACTURING METHOD FOR MOLDED ARTICLE OF FIBER-REINFORCED COMPOSITE MATERIAL AND MOLDED ARTICLE OF FIBER-REINFORCED COMPOSITE MATERIALS

(71) Applicant: Mitsubishi Chemical Corporation, Tokyo (JP)

(72) Inventors: Mitsuru Kutsuwada, Toyohashi (JP); Kouichi Akiyama, Toyohashi (JP); Yoshihide Kakimoto, Toyohashi (JP); Kazuhisa Ikeda, Toyohashi (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 436 days.

(21) Appl. No.: 14/426,521

(22) PCT Filed: Sep. 10, 2013

(86) PCT No.: PCT/JP2013/074386
§ 371 (c)(1),
(2) Date: Mar. 6, 2015

(87) PCT Pub. No.: WO2014/038710
PCT Pub. Date: Mar. 13, 2014

(65) Prior Publication Data
US 2015/0209982 A1    Jul. 30, 2015

(30) Foreign Application Priority Data

Sep. 10, 2012 (JP) ................................ 2012-198248

(51) Int. Cl.
*B29C 70/44* (2006.01)
*B29C 43/18* (2006.01)
(Continued)

(52) U.S. Cl.
CPC .............. *B29C 43/18* (2013.01); *B29B 11/16* (2013.01); *B29C 31/085* (2013.01); *B29C 43/14* (2013.01);
(Continued)

(58) Field of Classification Search
CPC ......... B29C 43/18; B29C 43/14; B29C 70/34; B29C 43/146; B29C 2043/148;
(Continued)

(56) References Cited

U.S. PATENT DOCUMENTS 8,263,205 B2 * 9/2012 Kweder ................. B29B 11/16
220/1.5
9,090,043 B2 * 7/2015 Matsen ...................... B32B 7/12
(Continued)

FOREIGN PATENT DOCUMENTS

CH      704 406 A1      7/2012
CN      102548741       7/2012
(Continued)

OTHER PUBLICATIONS

English translation of Tatsuo patent, JP2008290421, Dec. 2008.*
(Continued)

*Primary Examiner* — William P Bell
*Assistant Examiner* — Andrew L Swanson
(74) *Attorney, Agent, or Firm* — Oblon, McClelland, Maier & Neustadt, L.L.P.

(57) ABSTRACT

A manufacturing method for a molded article of a fiber-reinforced composite material obtains a molded article of a fiber-reinforced composite material having a three-dimensional shape by: preparing a sheet-shaped prepreg containing reinforcing fibers and a matrix resin composition; preliminarily shaping the prepreg to produce a plurality of partial preforms having shapes obtained by dividing the shape of the molded article; producing a first partial preform
(Continued)

group and a second partial preform group, which have the shape of the molded article, by combining the plurality of partial preforms so that the ends thereof in the direction perpendicular to the thickness direction do not overlap in the thickness direction; producing a preform by bringing the first and second partial preform groups into close contact with each other in the thickness direction; and compression molding the preform using a molding die.

19 Claims, 7 Drawing Sheets

(51) Int. Cl.
| | | |
|---|---|---|
| *B29C 70/34* | (2006.01) | |
| *B29B 11/16* | (2006.01) | |
| *C08J 5/04* | (2006.01) | |
| *B29C 31/08* | (2006.01) | |
| *B29C 43/14* | (2006.01) | |
| *B29L 31/00* | (2006.01) | |
| *B29L 9/00* | (2006.01) | |
| *B29K 105/08* | (2006.01) | |

(52) U.S. Cl.
CPC .............. *B29C 70/34* (2013.01); *C08J 5/042* (2013.01); *B29C 43/146* (2013.01); *B29C 2043/148* (2013.01); *B29K 2105/0872* (2013.01); *B29L 2009/00* (2013.01); *B29L 2031/001* (2013.01); *C08J 2363/00* (2013.01); *Y10T 428/19* (2015.01)

(58) Field of Classification Search
CPC ......... B29K 2105/0872; B29L 2009/00; B29L 2031/001; C08J 2363/00; C08J 5/042; B29B 11/16
See application file for complete search history.

(56) References Cited

U.S. PATENT DOCUMENTS

| | | |
|---|---|---|
| 2005/0253294 A1 | 11/2005 | Takano et al. |
| 2011/0064908 A1 | 3/2011 | Kweder |
| 2013/0306233 A1 | 11/2013 | Pini et al. |

FOREIGN PATENT DOCUMENTS

| | | | |
|---|---|---|---|
| JP | 2008 290421 | 12/2008 | |
| JP | 2008290421 | * 12/2008 | ............. B29C 43/14 |
| JP | 2009 83127 | 4/2009 | |
| JP | 2011-31481 A | 2/2011 | |
| WO | 2004 018186 | 3/2004 | |

OTHER PUBLICATIONS

Notice of Allowance dated May 7, 2015 in Japanese Patent Application No. 2013-544039 (with English Translation).
International Search Report dated Dec. 24, 2013 in PCT/JP13/074386 Filed Sep. 10, 2013.
Extended European Search Report dated Jan. 7, 2016 in Patent Application 13835358.6.
Office Action dated Sep. 10, 2018. Application No. 1459/CHENP/2015.

* cited by examiner

MANUFACTURING METHOD FOR MOLDED ARTICLE OF FIBER-REINFORCED COMPOSITE MATERIAL AND MOLDED ARTICLE OF FIBER-REINFORCED COMPOSITE MATERIALS

CROSS REFERENCE TO RELATED APPLICATIONS

The present application is a 35 U.S.C. § 371 national stage patent application of International patent application PCT/JP2013/074386, filed on Sep. 10, 2013, published as WO/2014/038710 on Mar. 13, 2014, the text of which is incorporated by reference, and claims the benefit of the filing date of Japanese application no. 2012-198248, filed on Sep. 10, 2012, the text of which is also incorporated by reference.

TECHNICAL FIELD

The present invention relates to a manufacturing method for a molded article of a fiber-reinforced composite material, in which a preform is formed by preliminarily shaping a sheet-shaped prepreg before the molding process so as to obtain the molded article of a fiber-reinforced resin having a desired three-dimensional shape.

BACKGROUND ART

Patent Document 1 discloses a technique of obtaining several kinds of cut pieces having desired shapes, by manufacturing a laminated plate by laminating UD prepregs (unidirectional prepregs), in each of which fiber directions are aligned in one direction, in the manner as the fiber directions are different from each other, and by cutting the laminated plate. Further, Patent Document 1 discloses a technique of obtaining a molded article by combining the cut pieces to manufacture a preform having a three-dimensional shape after obtaining the cut pieces, and then by press-molding the preform.

However, the cut pieces disclosed in Patent Document 1 are designed so that end portions of the laminated plate of the prepreg overlap in a thickness direction of the laminated plate when manufacturing the preform. That is, a portion having a non-uniform thickness occurs in the preform that is manufactured by combining the cut pieces. For that reason, since the pressure is excessively applied to the overlapped portion at the time of press-molding, there are a lot of locations at which the reinforced fibers of the obtained molded article meander. As a result, there is a problem that strength of the molded article is greatly lowered.

Also, Patent Document 1 does not disclose a specific manufacturing method for the preform. In this case, it is expected that a preform having a three-dimensional shape is manufactured at a time by sticking each of the obtained cut pieces into a desired shape by hand. For that reason since it takes a significant time in manufacturing the preform, a problem is expected in that the working efficiency is very poor.

CITATION LIST

Patent Document

Patent Document 1: US 2011/0064908 A

DISCLOSURE OF THE INVENTION

Problem to be Solved by the Invention

The present invention has been made in view of the above-described circumstances, and an object thereof is to provide a manufacturing method for a molded article of a fiber-reinforced composite material in which a preform having a three-dimensional shape is efficiently manufactured, and the molded article that is obtained by press-molding the preform has good physical properties.

Means for Solving Problem

A manufacturing method for a molded article of a fiber-reinforced composite materials according to a first aspect of the present invention obtains a molded article of a fiber-reinforced composite material having a three-dimensional shape, by preparing a sheet-shaped prepreg containing reinforcing fibers and a matrix resin composition; preliminarily shaping the prepreg to produce a plurality of partial preforms having shapes obtained by dividing the shape of the molded article of the fiber-reinforced composite material; combining the plurality of partial preforms to produce a first partial preform group and a second partial preform group, each of which has the shape of the molded article of the fiber-reinforced composite material, so that end portions of each of the plurality of partial preforms in a direction perpendicular to the thickness direction do not overlap in the thickness direction; bringing the first and second partial preform groups into close contact with each other in the thickness direction to produce the preform; and compression-molding the preform using a molding die.

The process of preliminarily shaping the laminated prepreg may include preliminarily shaping the planar prepreg into a three-dimensional shape at least by bending or squeezing.

The prepreg may be a laminated prepreg in which the plurality of prepreg sheets are laminated so that orientation directions of the reinforcing fibers of the overlapping prepreg sheets are different.

In the first partial preform group and the second partial preform group, the end surfaces of the plurality of partial preforms may be disposed by butting against each other.

When lines that divide the shape of the molded article of the fiber-reinforced composite material into the plurality of partial shapes are parting lines, a parting line of the plurality of partial shapes forming the first partial preform group and a parting line of the plurality of partial shapes forming the second partial preform group may be disposed so as not to overlap each other on a same line.

The three-dimensional shape may be a three-dimensional shape that includes a point at which three or more surfaces intersect with one another.

A molded article molded of a fiber-reinforced composite material according to a second aspect of the invention is a molded article of a fiber-reinforced composite material that is manufactured by the manufacturing method for the molded article of the fiber-reinforced composite material according to the first aspect of the present invention.

Effect of the Invention

According to the manufacturing method for the molded article of a fiber-reinforced composite material according to the aspect of the present invention, a preform having a three-dimensional shape can be efficiently manufactured, and it is possible to provide satisfactory physical properties of the molded article obtained by press-forming the preform.

Figure 1:
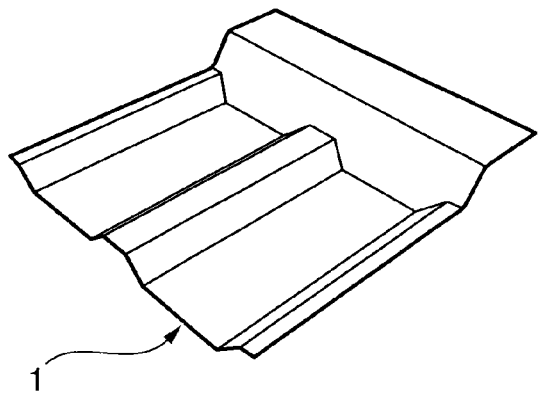
FIG. 1 is a perspective view of a molded article according to the first example of the present invention.

MODES FOR CARRYING OUT THE INVENTION (Sheet-Shaped Prepreg)

A sheet-shaped prepreg used in a manufacturing method for a molded article of a fiber-reinforced composite material according to an embodiment of the present invention is a sheet-shaped prepreg that contains reinforcing fibers and a matrix resin composition.

The form of the prepreg may be a UD prepreg in which the reinforcing fibers are aligned in one direction, and may be a fabric prepreg in which the reinforcing fibers are woven. Also, it may be a prepreg made up of a so-called non-crimp fabric (NCF) in which a plurality of reinforcing fiber sheets obtained by aligning the reinforcing fibers in one direction overlap in different directions from each other, and is integrated by the auxiliary fibers.

(Reinforcing Fibers)

As the reinforcing fibers used in the manufacturing method for the molded article of a fiber-reinforced composite material according to the embodiment of the present invention, for example, carbon fibers, glass fibers, aramid fibers, high-strength polyester fibers, boron fibers, alumina fibers, silicon nitride fibers, nylon fibers and the like are adopted. Among these, carbon fibers are preferred, because they are excellent in specific strength and specific elasticity.

(Matrix Resin Composition)

As the matrix resin composition used in the manufacturing method for the molded article of a fiber-reinforced composite material according to the embodiment of the present invention, for example, epoxy resins, unsaturated polyester resins, acrylic resins, vinyl ester resins, phenolic resins, benzoxazine resins and the like are adopted. Among these, epoxy resins are preferred, because it is possible to obtain high strength after curing.

Various additives, such as curing agents, mold release agents, defoaming agents, UV absorbing agents, and fillers may be contained in the prepreg.

(Determining Method for Partial Shape)

The partial shape is a shape obtained by dividing the shape of the molded article that is in the final shape. As the partial shapes, shapes capable of being reasonably shaped, when a laminated bodies obtained by laminating a plurality of sheet-shaped prepregs are preliminarily shaped later to produce partial preforms, are adopted. Here, the parting line(s) which divide the shape of the molded article into a plurality of partial shapes is(are) defined as the parting line pattern.

More specifically, as long as a shape can be shaped by stretching or tightening the laminated body (hereinafter, this deformation is referred to as "shear deformation") to some extent, any shape can be used as a partial shape according to the embodiment of the present invention. Also, since the subsequent shaping can be more easily performed, it is more preferred to use a shape that can be shaped, for example, only by being bent or curved without causing the shear deformation.

As the size of the partial shape, any size may be adopted at which the above-described shear deformation is easily performed, and the size is not particularly limited. Also, the size is preferably determined to be the same as the shape of the obtained molded article when connecting all the partial shapes. Also, for example, when it is desired to manufacture a molded article by overlapping a partial preform group (described below) identical to the shape of the molded article and a partial preform group having a shape in which a part of the molded article is lacked, a shape in which a part of the molded article is lacked may be used as a shape in which all the partial shapes are connected, and the shapes may be appropriately determined when designing the product.

Although the division from the molded article shape to the partial shape using a single method has been described above, in the case of division into the partial shape of different shapes using a plurality of methods, when overlapping the partial preforms (partial preform group) to be described below, it is preferred to dispose the parting lines so that each of the parting lines does not overlap on the same line in the thickness direction. In other words, in the case of generating a plurality of different parting line patterns, when overlapping the partial reforms, it is preferred to dispose the parting lines so that each of the parting lines does not overlap on the same line in the thickness direction.

In this way, by disposing a plurality of different parting lines, even if the fibers of the molded article are cut at the end portion of a particular partial preform, it is possible to disperse and transmit the stress in the overlapped other partial preform. Therefore, it is possible to prevent the reduction in strength of the obtained molded article.

In addition, the parting line is not limited to the case of being made up of straight lines, and it may be made up of curved lines, a wavy form, a triangular wave, a pulse wave, a sine wave or the like. When each of the end surfaces of the partial preform is connected by compression-molding to be described below, an area of a connected surface of the end surface increases as the length of the parting line becomes longer, and the bonding strength increases.

(Determining Method for Planar Shape from Partial Shape)

The planar shape is a shape from which the above-mentioned partial shape can be produced by shaping, and is the shape before the shaping. A determining method for the planar shape, for example, is as follows: a laminated body of a plurality of sheet-shaped prepregs which have been cut into oversize in advance is manually shaped using a die; and outer peripheral portions are trimmed to obtain a shaped product having a desired partial shape; and, after the shaping product is detached from the die and returned to a two-dimensional shape by stretching, its shape is captured by a scanner or the outer peripheral shape is measured by a three-dimensional measuring device, thereby determining the planar shape.

Also, in the case that three-dimensional CAD data of the shape of the molded article is available, it is possible to determine the planar shape, by extracting the data of a desired partial shape from the three-dimensional CAD data, and by using a software (for example, FiberSim (product name) produced by Siemens PLM Software Inc.) which can generate the planar shape data by developing the data of the partial shape. Since the accuracy of the obtained planar shape is enhanced, it is preferred to use the software.

(Producing Method for Partial Preform)

The producing method for the partial preform is carried out along the following steps.

(1) The prepreg is cut to have a desired planar shape.

(2) A laminated body having a desired laminate configuration is obtained by laminating the cut prepregs.

(3) A partial preform is obtained by preliminarily shaping the laminated body by a desired method. However, the step (2) may be omitted, and it is also possible to use the cut prepreg obtained in the step (1), instead of the laminated body in the step (3).

The above-described steps will be described in detail below.

First, the sheet-shaped prepreg is cut so as to obtain a planar shape as described above. As a cutting method for the prepreg, the prepreg may be cut using scissors, and as long as a two-dimensional CAD data is adopted, the prepreg may be cut along the data using a cutting plotter. Since it is possible to improve the accuracy of cutting shapes, it is preferred to cut the prepreg using a cutting plotter.

Next, a laminated body having a desired configuration is obtained by laminating the cut prepregs. As the laminate configuration, it is not particularly limited, and a unidirectional lamination, an orthogonal lamination, a quasi-isotropic lamination or the like are used, but the orthogonal lamination is preferred from the viewpoint that the prepreg is easily subjected to shear deformation. In particular, in many cases, it is not necessary to obtain a laminated element when using a prepreg that is made up of a fabric prepreg or NCF.

Also, thickness of the laminated body is preferably 0.1 to 5.0 mm, and, more preferably, is 0.4 mm to 2.0 mm. When the thickness of the laminated body is less than the lower limit value (0.1 mm), since the thickness is too thin, it is difficult to keep the shape of the partial preform to be obtained later, and the working efficiency decreases due to an increase in the number of the laminating work. Furthermore, when the thickness of the laminated element is over the upper limit value (5.0 mm), since the thickness is too thick, shaping becomes difficult, and wrinkles or the like may occur in the obtained shaped product.

Moreover, a partial preform is obtained by preliminarily shaping the laminated body or the cut prepreg by the desired method. As an obtaining method for the partial preform, for example, the laminated body may be shaped by sticking it to the die by hand, the laminated body may be shaped by disposing the laminated body on the die, disposing a rubber membrane or the like over the laminated body and evacuating the interior and crimping the rubber membrane to the die via the laminated body, and the laminated body may be shaped by disposing a male die and a female die on a simple molding machine and compressing the laminated body between the male die and the female die. Since a large shape can also be shaped in a short time, it is preferred to shape the laminated body by compressing the laminated body between the male die and the female die.

In addition, if the plural molding machines are available and are simultaneously operated, it is possible to greatly shorten the process, since it is possible to simultaneously manufacture several kinds of partial preforms.

(Preform)

As the preform capable of being used in the manufacturing method for the molded article of a fiber-reinforced composite material according to an embodiment of the present invention, the preform may be produced by combining and integrating the several kinds of partial preforms. The combining method is not particularly limited as long as all the partial preforms having the divided partial shape are combined and the end portions of the adjacent partial preforms in a direction perpendicular to the thickness direction do not greatly overlap each other in the thickness direction or generate a large gap from each other.

When a part of the partial preform is lacked or the end portions of the adjacent partial preforms in the direction perpendicular to the thickness direction greatly overlap each other in the thickness direction or generate a large gap, a portion in which the thickness of the preform is not uniform occurs. Therefore, the pressure applied to the portion during press-molding becomes non-uniform, the great meandering of the reinforcing fibers occurs in the obtained molded article, and as a result, there is a problem in that the strength of the molded article is greatly lowered. Accordingly, it is necessary to avoid such problems. In addition, when combining the preforms so that its thickness is constant, it is preferred to dispose the preforms so that the end surfaces of the adjacent partial preforms in a direction perpendicular to the thickness direction do not overlap in the thickness direction, and the preforms may be disposed so that the end surfaces of the partial preforms butts each other. In addition, the state in which the end surfaces butts each other in the present invention includes a state in which a little clearance opens between the end portion and the end portion, as well as a state in which the end surfaces are in full contact with each other.

Furthermore, as the order of combining the partial preforms, it is preferable that, when dividing the preforms into the partial shapes by several kinds of methods, first, after obtaining the partial preforms of the overall shape by combining all the partial preforms divided by one method, the partial preforms divided by another method be combined.

In other words, the preform of the overall shape (a first partial preform group) is formed by combining the partial preforms made up of one parting line pattern, selected from a plurality of different parting line pattern configurations. Next, on the obtained preforms of the overall shape, the partial preforms according to another parting line pattern to form the overall shape (a second partial preform group) are preferably combined. In this case, as described above, when overlapping the partial first and second partial preform groups, it is preferred that each of the parting lines be disposed so that each of the parting lines does not overlap on the same line in the thickness direction.

In addition, the number of lamination of the preforms of the overall shape (partial preform groups) is not particularly limited, and it may be appropriately designed depending on characteristics required for the molded article. In this case, it is also preferred that the parting lines be disposed so that the parting lines of all the partial preform groups do not overlap on the same line.

By combining the partial preforms in such an order, it is possible to combine the partial preforms in improved work efficiency.

Furthermore, as a method of integrating the combined partial preforms, for example, all the partial preforms may be simply disposed by hand, and after all the partial preforms are disposed on the die and a rubber membrane or the like is disposed from the top thereof, the rubber membrane may be crimped to the die via the partial preforms by evacuating the interior, thereby producing the preform. Also, after a male die and a female die are disposed in a simple molding machine and all the partial preforms are disposed on one die, the other die may be closed and the partial preforms may be pinched between the male die and the female die, thereby producing the preform. Since it is easy to remove air between the partial preforms, it is preferred to adopt the method in which the rubber membrane is crimped to the die via the partial preform by evacuation.

(Molding Process)

The preform produced by the above-described method is introduced into a die in which a clearance depending on the preform thickness is set, and the preform is cured by heating and pressurizing to the desired temperature and pressure using a press machine to obtain a molded article.

At that time, the temperature of the die is regulated to the desired temperature, and it is preferred to take out the molded article while keeping the temperature after being compression-molded. By doing so, it is not necessary to raise or lower the temperature of the die, and it is possible to enhance the molding cycle. Therefore, it is possible to enhance productivity.

EXAMPLES

Hereinafter, the present invention will be described more specifically by way of examples. However, the present invention is not intended to be limited to the examples.

First Example

In this example, a manufacturing method for a molded article of a fiber-reinforced composite material for obtaining the molded article 1 having the shape illustrated in FIG. 1 will be described.

Figure 2:
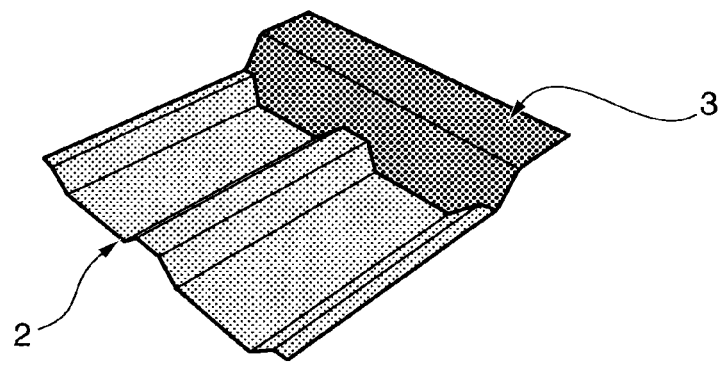
FIG. 2 is a diagram illustrating partial shapes of the molded article according to the first example of the present invention.
Figure 3:
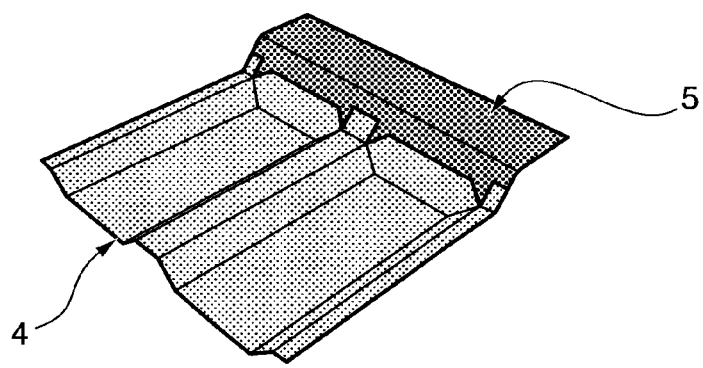
FIG. 3 is a diagram illustrating partial shapes of the molded article according to the first example of the present invention.

First, the partial shape 2 and the partial shape 3 obtained by dividing the shape of the molded article 1 into two parts were prepared, as illustrated in FIG. 2. Also, the partial shape 4 and the partial shape 5 obtained by dividing the shape of the molded article 1 into two parts were prepared, as illustrated in FIG. 3.

At this time, a parting line between the partial shape 2 & the partial shape 3 and a parting line between the partial shape 4 & the partial shape 5 are chosen so as not to overlap each other on the same line.

Thereafter, three-dimensional CAD data of the partial shape 2, the partial shape 3, the partial shape 4, and the partial shape 5 were extracted from three-dimensional CAD data of the molded article 1.

Figure 4:
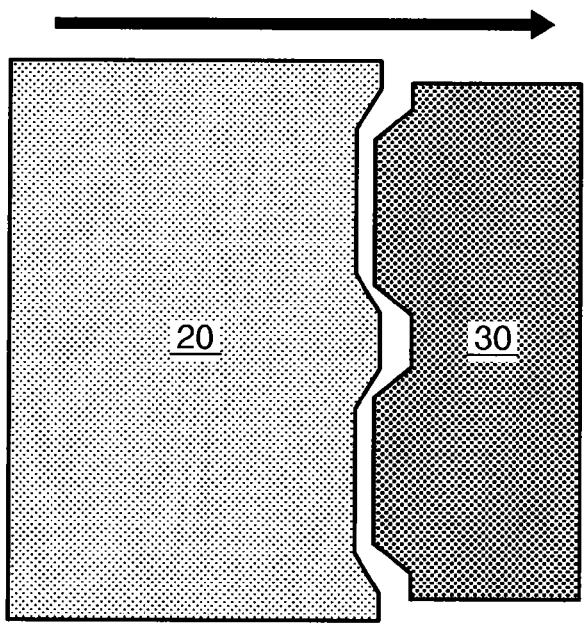
FIG. 4 is a diagram illustrating planar shapes according to the first example of the present invention.
Figure 5:
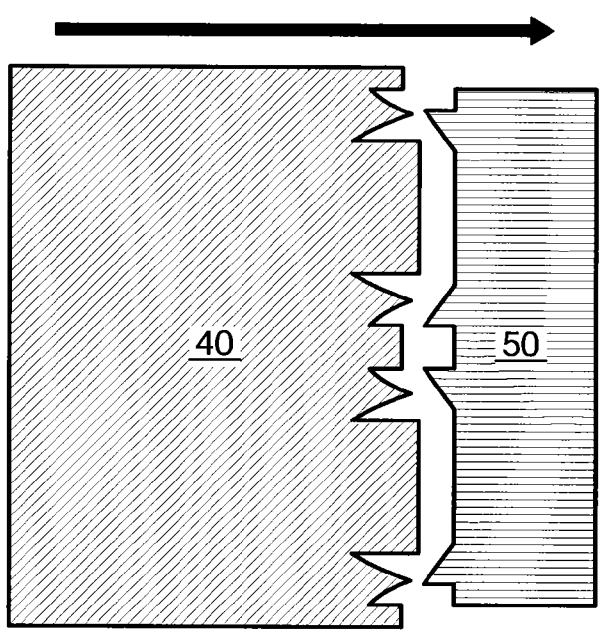
FIG. 5 is a diagram illustrating planar shapes according to the first example of the present invention.

Next, as illustrated in FIGS. 4 and 5, the planar shape 20 is generated using a planar shape generation software (produced by Siemens PLM Software Inc., product name: FiberSim) from the three-dimensional CAD data of the partial shape 2. Similarly, the planar shape 30 was generated from the partial shape 3, the planar shape 40 was generated from the partial shape 4, and the planar shape 50 was generated from the partial shape 5.

Next, a prepreg sheet (produced by Mitsubishi Rayon Co., Ltd., product name: TR391E250S, thickness per sheet: 0.22 mm), in which epoxy resin composition was impregnated in carbon fibers aligned in one direction, was prepared.

Thereafter, from the prepreg sheet three sheets having the same shape as that of the planar shape 20 were cut out using a cutting plotter so that the direction of the arrow in FIG. 4 becomes 0° direction of the carbon fibers, and two sheets having the same shape as that of the planar shape 20 were cut out so that the direction perpendicular to the direction of the arrow in FIG. 4 becomes the 0° direction of the carbon fibers.

A laminated sheet 6 (laminated prepreg) was prepared, by laminating the cut prepreg sheets so that an orientation direction of the carbon fibers (reinforcing fibers) is 0/90/0/90/0 (so that the orientation directions of carbon fibers of the overlapping prepreg sheets are different).

Next, a female die 7 and a male die 8 required for shaping the laminated sheet 6, which was cut into the planar shape 20, into a partial shape 2, and a molding machine 9 for operating the female die 7 and the male die 8 were prepared, and the female die 7 and the male die 8 were disposed on the molding machine 9. At this time, the female die 7 was disposed as the movable upper die, and the male die 8 was disposed as the stationary lower die.

Figure 6:
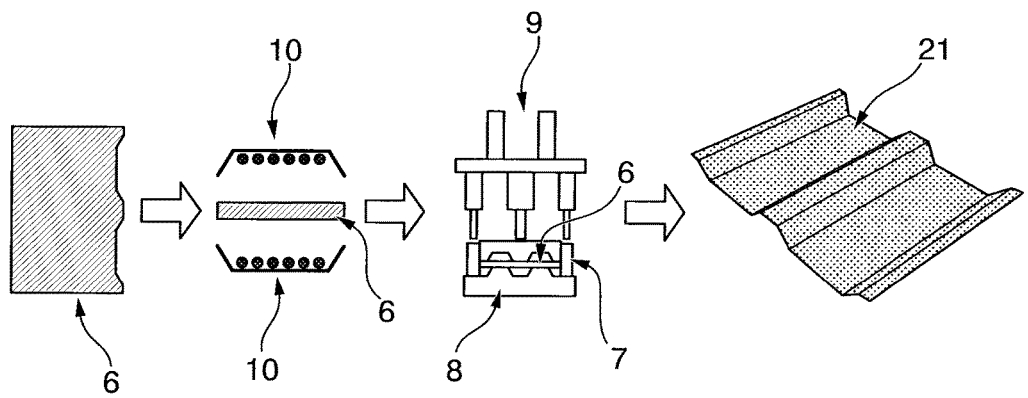
FIG. 6 is a diagram illustrating the molded article according to the first example of the present invention.

Subsequently, after the laminated sheet 6 was disposed on the male die 8, the laminated sheet 6 was heated with an infrared heater 10 so that its surface temperature became about 60° C. After heating the laminated sheet 6, the female die 7 was lowered to interpose the laminated sheet 6 between the male die and the female die, thereby shaping the laminated sheet 6 (FIG. 6).

Subsequently, after cooling the laminated sheet 6 by blowing air to the male die and the female die, the female die 7 is raised to take out a partial preform 21, which is formed by shaping the laminated sheet 6 into the partial shape 2, from the male die 8.

Furthermore, the same operation as described above was performed on the partial shapes 3, 4 and 5 to obtain partial preforms 31, 41 and 51.

Figure 7:
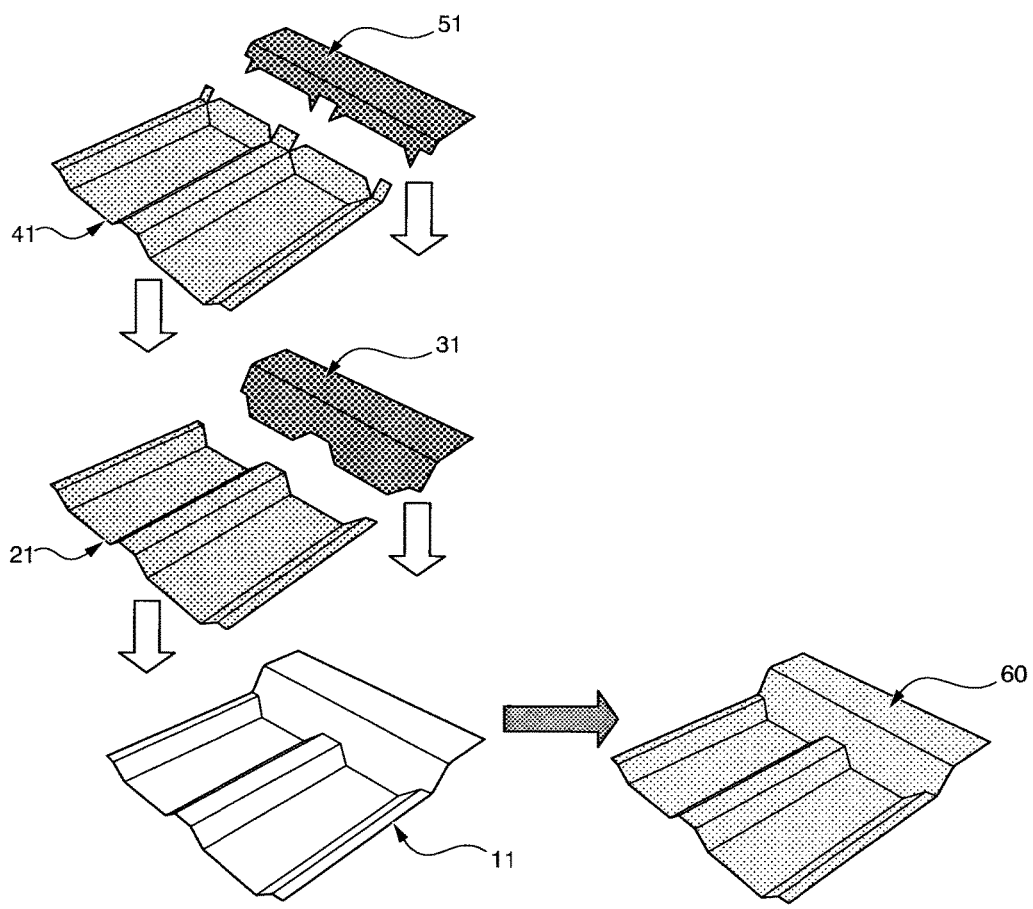
FIG. 7 is a diagram illustrating the molded article according to the first example of the present invention.
Figure 8A:
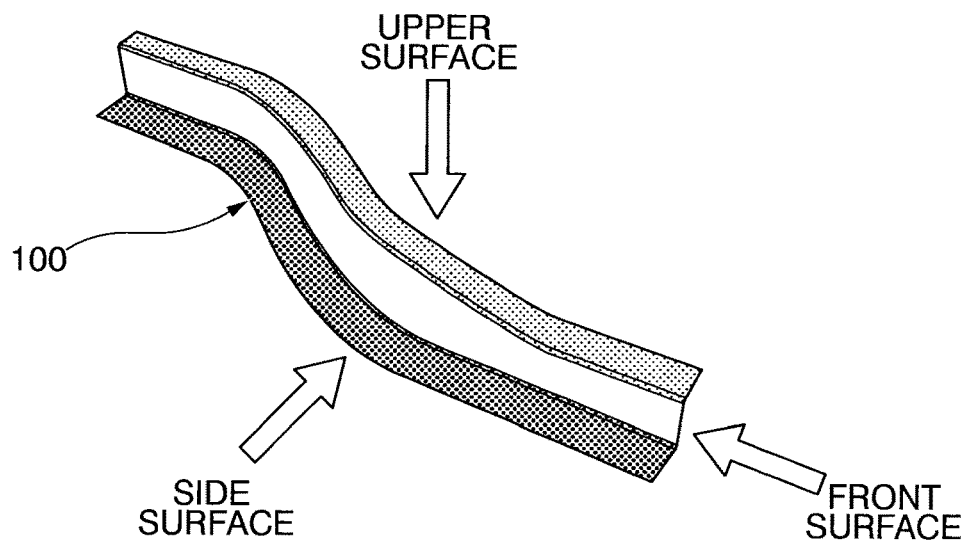
FIG. 8A is a diagram of the shape of the molded article according to the second example of the present invention when viewed from the oblique top.
Figure 8B:
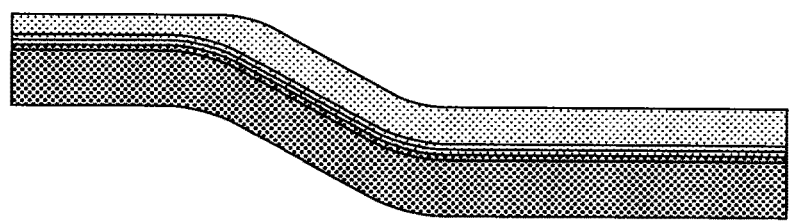
FIG. 8B is a top view diagram of the shape of the molded article illustrated in FIG. 8A.
Figure 8C:
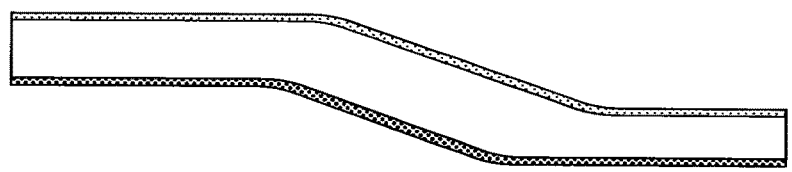
FIG. 8C is a side view diagram of the shape of the molded article illustrated in FIG. 8A.
Figure 8D:
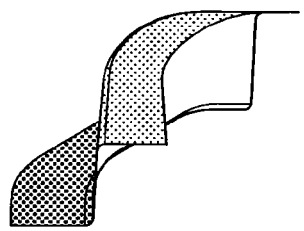
FIG. 8D is a front view diagram of the shape of the molded article illustrated in FIG. 8A.

Next, as illustrated in FIG. 7, a preform die 11 capable of forming the shape of the molded article 1 was prepared, and the partial preforms 21 and 31 were disposed thereon. Thereafter, the partial preforms 41 and 51 were disposed from the top thereof. At that time, each of the partial preforms 21, 31, 41 and 51 was disposed so that the end portions of the adjacent partial preforms in a direction perpendicular to the thickness direction do not greatly overlap each other, or generate a large gap from each other.

Thereafter, after disposing the rubber membrane from the top of the disposed partial preforms, the rubber membrane was crimped to the preform die 11 in a state of interposing the preform by evacuating the interior. The partial preforms were brought into close contact with each other to obtain the preform 60. In this way, it was possible to efficiently produce a preform having a three-dimensional shape.

Thereafter, the preform 60 was disposed on the lower die for compression molding heated to a predetermined temperature, and the preform 60 was interposed between the upper and lower dies to perform heating and pressing, thereby obtaining a molded article of a fiber-reinforced resin. Meandering of the reinforcing fibers was not observed in the obtained molded article.

Figure 13:
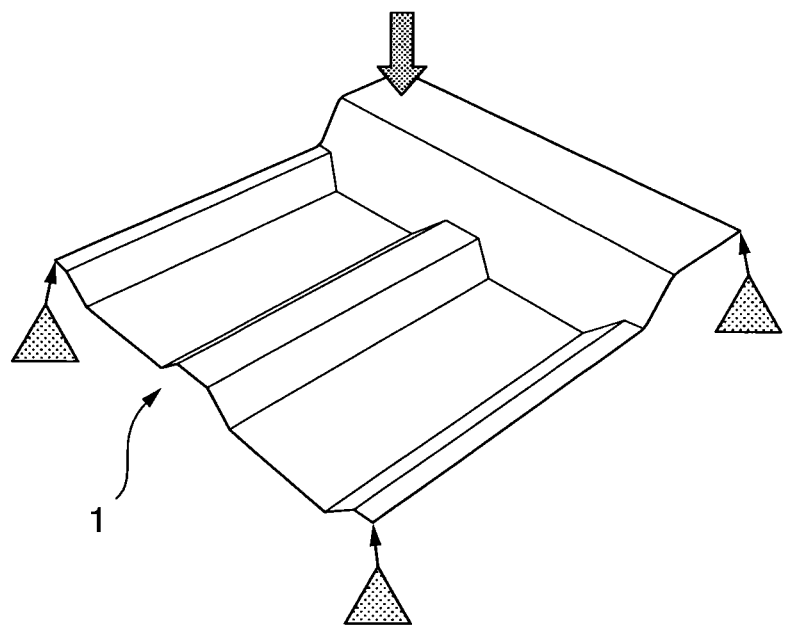
FIG. 13 is a diagram illustrating a strength test of a molded article obtained by the first example of the present invention.

Next, as illustrated in FIG. 13, a test in which three corner points of the molded article were constrained and a load was applied to the remaining one point from the top was performed on the obtained molded article. As a result, since the target load was cleared, the physical properties of the obtained molded article were favorable.

Second Example

In the present example, a manufacturing method for a molded article of a fiber-reinforced composite material for obtaining a molded article 100 having the shape illustrated in FIGS. 8A to 8D will be described.

Figure 9:
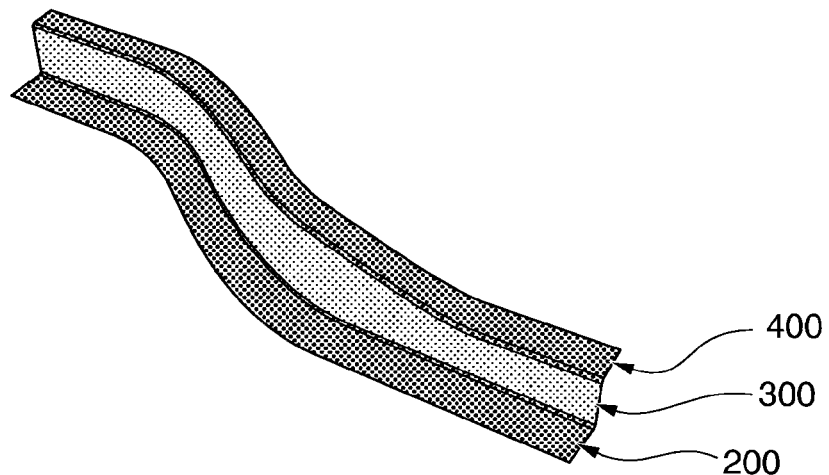
FIG. 9 is a diagram illustrating partial shapes of the molded article according to the second example of the present invention.
Figure 10:
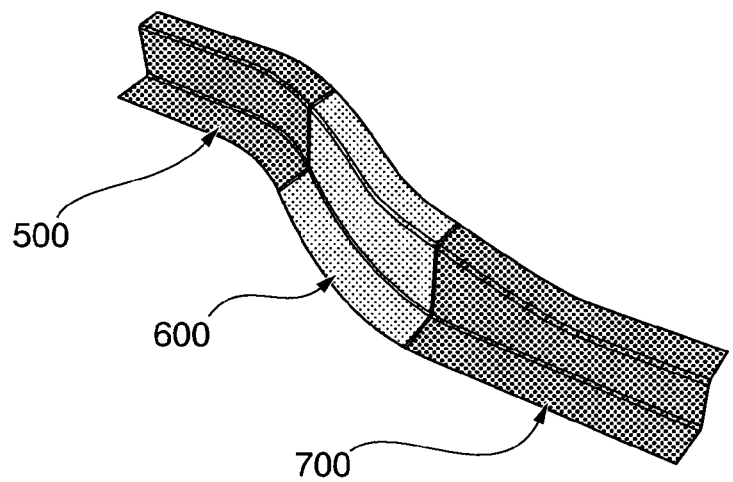
FIG. 10 is a diagram illustrating partial shapes of the molded article according to the second example of the present invention.

First, the shape of the molded article 100 was divided into the partial shape 200, the partial shape 300 and the partial shape 400 as illustrated in FIG. 9. Also, the shape was divided into the partial shape 500, the partial shape 600 and the partial shape 700 as illustrated in FIG. 10 according to a different division pattern.

Thereafter, three-dimensional CAD data of the partial shape 200, the partial shape 300, the partial shape 400, the partial shape 500, the partial shape 600 and the partial shape 700 were extracted from the three-dimensional CAD data of the molded article 100.

Figure 11:
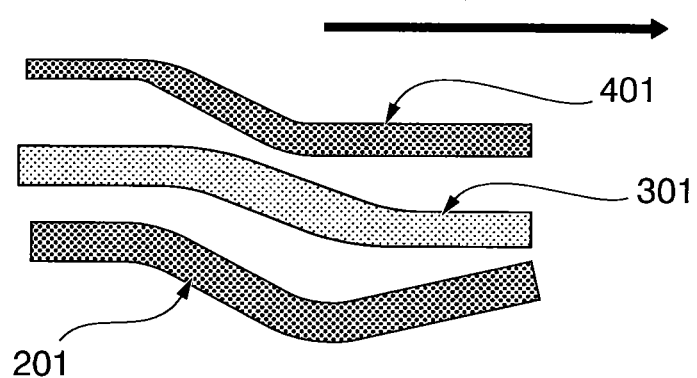
FIG. 11 is a diagram illustrating planar shapes according to the second example of the present invention.
Figure 12:
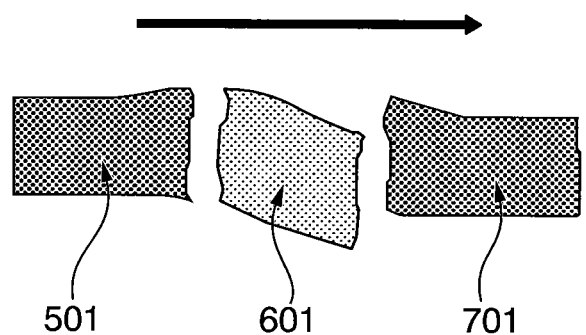
FIG. 12 is a diagram illustrating planar shapes of the molded article according to the second example of the present invention.

Next, as illustrated in FIGS. 11 and 12, the planar shape 201 was generated, using the planar shape generation software (produced by Vistagy Inc., product name: FiberSim) from the three-dimensional CAD data of the partial shape 200. Similarly, the planar shape 301 was generated from the partial shape 300, the planar shape 401 was generated from the partial shape 400, the planar shape 501 was generated from the partial shape 500, the planar shape 601 was generated from the partial shape 600, and the planar shape 701 was generated from the partial shape 700.

The parting lines obtained from the partial shapes 200, 300 and 400, and the parting lines obtained from the partial shapes 500, 600 and 700 do not overlap each other on the same line.

The preform 800 was produced in the same manner as in the first example regarding the used prepreg sheet, the laminate configuration, the producing method for the partial preform or the like. As a result, a preform having a three-dimensional shape was able to be efficiently produced.

Thereafter, a molded article of a fiber-reinforced resin was obtained, by disposing the preform 800 on the lower die for compression molding heated to a predetermined temperature, and by interposing the preform 800 between the upper and lower dies to perform heating and pressing. Meandering of the reinforcing fibers was not observed in the obtained molded article.

Figure 14:
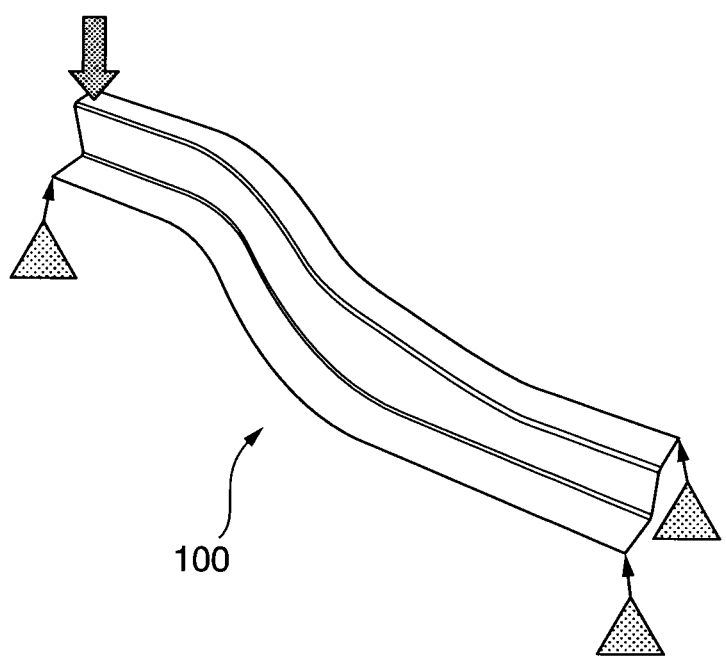
FIG. 14 is a diagram illustrating a strength test of a molded article obtained by the second example of the present invention.

Next, as illustrated in FIG. 14, a test in which the three corner points of the molded article were constrained and a load is applied to the remaining one point from the top was performed on the obtained molded article. As a result, since the target load was cleared, the physical properties of the obtained molded article were favorable.

EXPLANATIONS OF LETTERS OR NUMERALS

1 MOLDED ARTICLE
2 PARTIAL SHAPE
3 PARTIAL SHAPE
4 PARTIAL SHAPE
5 PARTIAL SHAPE
6 LAMINATED SHEET
7 FEMALE DIE
8 MALE DIE
9 MOLDING MACHINE
10 INFRARED HEATER
11 PREFORM DIE
20 PLANAR SHAPE
30 PLANAR SHAPE
40 PLANAR SHAPE
50 PLANAR SHAPE
21 PARTIAL PREFORM
31 PARTIAL PREFORM
41 PARTIAL PREFORM
51 PARTIAL PREFORM
60 PREFORM
100 MOLDED ARTICLE
200 PARTIAL SHAPE
300 PARTIAL SHAPE
400 PARTIAL SHAPE
500 PARTIAL SHAPE
600 PARTIAL SHAPE
700 PARTIAL SHAPE
201 PLANAR SHAPE
301 PLANAR SHAPE
401 PLANAR SHAPE
501 PLANAR SHAPE
601 PLANAR SHAPE
701 PLANAR SHAPE

The invention claimed is:

1. A manufacturing method for a molded article of fiber-reinforced composite material, the method comprising:
preparing a planar sheet-shaped prepreg comprising reinforcing fibers and a matrix resin composition;
preliminarily shaping the planar sheet-shaped prepreg, to produce a plurality of partial preforms having partial shapes obtained by dividing a shape of the molded article molded of the fiber-reinforced composite material, the preliminary shaping of the planar sheet-shaped prepreg comprising forming the planar sheet-shaped prepreg into three-dimensional shapes at least by bending and squeezing to obtain the plurality of partial preforms where each of the partial preforms has a three-dimensional shape;
combining the plurality of partial preforms to produce a first partial preform group and a second partial preform group, each of which has the shape of the molded article of the fiber-reinforced composite material; so that end portions of each of the plurality of partial preforms in a direction perpendicular to the thickness direction do not overlap in the thickness direction;

bringing the first partial preform group and the second partial preform group into contact with each other in the thickness direction to produce a preform; and compression-molding the preform using a molding die to obtain the molded article of fiber-reinforced composite material.

2. The manufacturing method according to claim 1, wherein the planar sheet-shaped prepreg is a laminated prepreg in which a plurality of prepreg sheets are laminated so that orientation directions of the reinforcing fibers of the overlapping prepreg sheets are different.

3. The manufacturing method according to claim wherein, in the first partial preform group and the second partial preform group, end surfaces of the plurality of partial preforms are disposed by butting against each other.

4. The manufacturing method according to claim 1, wherein, when lines that divide the shape of the molded article of the fiber-reinforced composite material into the plurality of partial shapes are parting lines, a parting line of the plurality of partial shapes forming the first partial preform group and a parting line of the plurality of partial shapes forming the second partial preform group are disposed so as not to overlap each other on a same line.

5. The manufacturing method according to claim 1, wherein the three-dimensional shape is a three-dimensional shape comprising a point at which three or more surfaces intersect with one another.

6. A molded article of fiber-reinforced composite material manufactured by the manufacturing method according to claim 1, wherein after combining the plurality of partial preforms to produce the first partial preform group and the second partial preform group, none of the plurality of the partial performs are attached to another one of the partial preforms.

7. The manufacturing method according to claim 2, wherein, in the first partial preform group and the second partial preform group, end surfaces of the plurality of partial preforms are disposed by butting against each other.

8. The manufacturing method according to claim 2, wherein, when lines that divide the shape of the molded article of the fiber-reinforced composite material into the plurality of partial shapes are parting lines, a parting line of the plurality of partial shapes forming the first partial preform group and a parting line of the plurality of partial shapes forming the second partial preform group are disposed so as not to overlap each other on a same line.

9. The manufacturing method according to claim 3, wherein, when lines that divide the shape of the molded article of the fiber-reinforced composite material into the plurality of partial shapes are parting lines, a parting line of the plurality of partial shapes forming the first partial preform group and a parting line of the plurality of partial shapes forming the second partial preform group are disposed so as not to overlap each other on a same line.

10. The manufacturing method according to claim 7, wherein, when lines that divide the shape of the molded article of the fiber-reinforced composite material into the plurality of partial shapes are parting lines, a parting line of the plurality of partial shapes forming the first partial preform group and a parting line of the plurality of partial shapes forming the second partial preform group are disposed so as not to overlap each other on a same line.

11. The manufacturing method according to claim 2, wherein the three-dimensional shape is a three-dimensional shape comprising a point at which three or more surfaces intersect with one another.

12. The manufacturing method according to claim 3, wherein the three-dimensional shape is a three-dimensional shape comprising a point at which three or more surfaces intersect with one another.

13. The manufacturing method according to claim 4, wherein the three-dimensional shape is a three-dimensional shape comprising a point at which three or more surfaces intersect with one another.

14. The manufacturing method according to claim 7, wherein the three-dimensional shape is a three-dimensional shape comprising a point at which three or more surfaces intersect with one another.

15. The manufacturing method according to claim 8, wherein the three-dimensional shape is a three-dimensional shape comprising a point at which three or more surfaces intersect with one another.

16. The manufacturing method according to claim 9, wherein the three-dimensional shape is a three-dimensional shape comprising a point at which three or more surfaces intersect with one another.

17. The manufacturing method according to claim 10, wherein the three-dimensional shape is a three-dimensional shape comprising a point at which three or more surfaces intersect with one another.

18. A molded article of fiber-reinforced composite material manufactured by the manufacturing method according to claim 2, wherein after combining the plurality of partial preforms to produce the first partial preform group and the second partial preform group, none of the plurality of the partial performs are attached to another one of the partial preforms.

19. A molded article of fiber-reinforced composite material manufactured by the manufacturing method according to claim 17, wherein after combining, the plurality of partial preforms to produce the first partial preform group and the second partial preform group none of the plurality of the partial performs are attached to another one of the partial preforms.

* * * * *